Dec. 25, 1928.
G. G. TIERNEY
VENTILATOR
Filed May 19, 1927
1,696,423
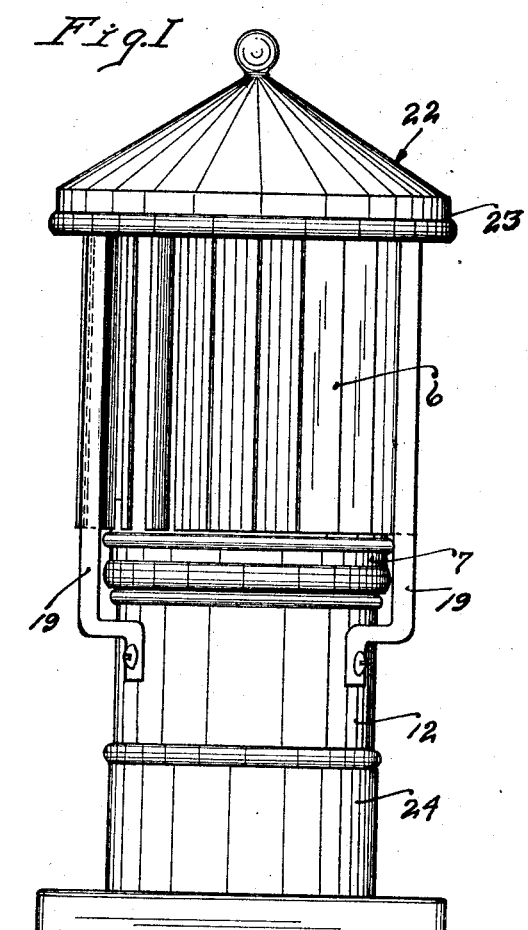
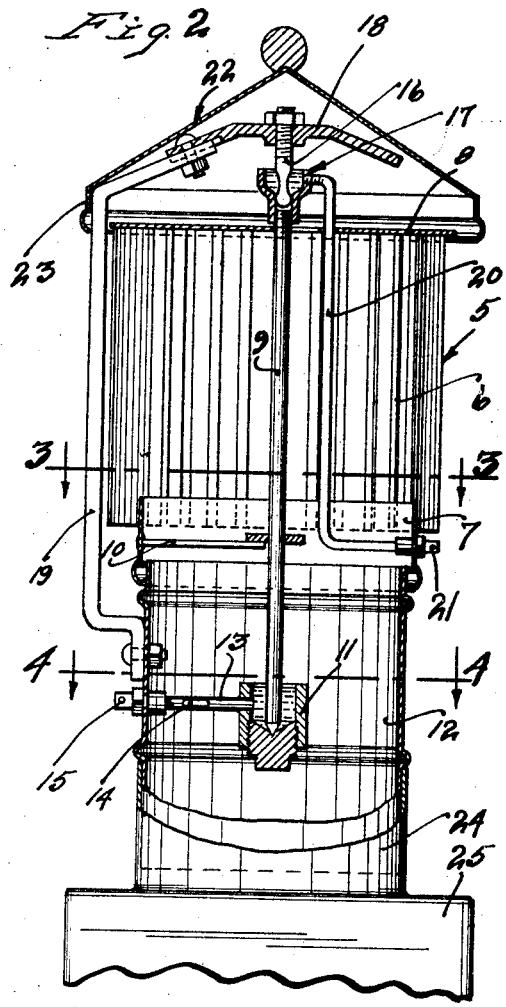
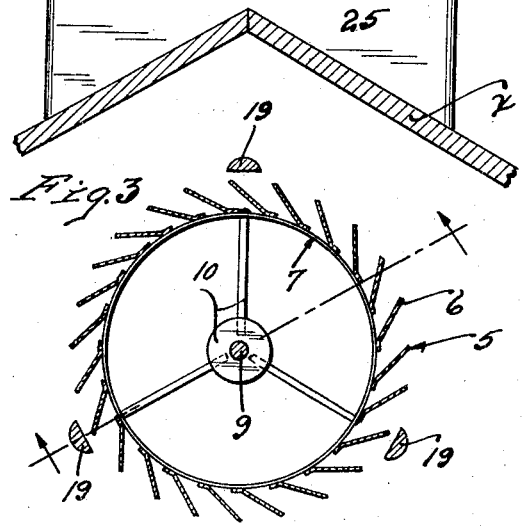
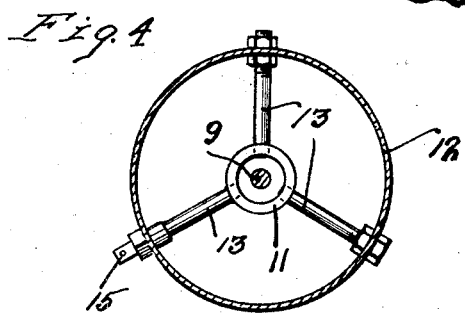
Inventor
George G. Tierney
By his Attorneys
Merchant and Kilgore Patented Dec. 25, 1928.

1,696,423

UNITED STATES PATENT OFFICE.

GEORGE G. TIERNEY, OF MINNEAPOLIS, MINNESOTA.

VENTILATOR.

Application filed May 19, 1927. Serial No. 192,585.

My present invention has for its object to provide an extremely simple and highly efficient ventilator for vents, stacks, buildings, and the like, and to this end it consists of the novel devices and combinations of devices hereinafter described and defined in the claim.

In the accompanying drawings, which illustrate the invention, like characters indicate like parts throughout the several views.

Referring to the drawings:

Fig. 1 is an elevation of the ventilator;

Fig. 2 is a view principally in central vertical section;

Fig. 3 is a transverse section taken on the line 3—3 of Fig. 2; and

Fig. 4 is a transverse section taken on the line 4—4 of Fig. 2.

The numeral 5 indicates an upright cylindrical wind wheel comprising a multiplicity of relatively long flat upright circumferentially spaced blades 6 set transversely to radial lines that project from the axis of said wheel. These blades 6 are rigidly secured to a cylindrical supporting member 7, to the periphery of which the lower end of said blades are secured, and a flat disc-like head 8. This head 8 rests directly on the upper ends of the blades 6, closes the upper end of the wheel 5 and is of such diameter as to extend slightly outward of said blades. Extending axially through the wheel 5 is a shaft 9, the upper end portion of which extends axially through the head 8, is rigidly secured thereto, and the lower end portion of said shaft is rigidly secured by a bearing spider 10 to the supporting member 7.

By reference to Fig. 3, it will be noted that adjacent blades 6 are in diverging relation to each other and the arrangement of said blades is such that the ventilator will exhaust the maximum amount of air therebetween. The lower end portion of the shaft 9 projects materially below the supporting member 7 and is provided with a conical lower end supported on a conical seat in a cup-like bearing 11. This bearing is axially located in an upright cylindrical body member 12 and rigidly secured thereto by radial tubular arms 13 rigidly secured to said body member. One of the arms 13 affords a grease duct 14 having on its outer end a valve-equipped grease gun coupling 15. Obviously, by applying a grease gun to the coupling 15, grease may be forced through the duct 14 and into the bearing 11 for lubricating the lower end of the shaft 9. The upper end portion of the body member 12 projects slightly into the supporting member 7 and affords a relatively tight and water-proof joint between said supporting member 7 and body member 12.

The wheel 6 is held in an upright position by a depending fixed trunnion 16 axially aligned with the shaft 9 and seated in a cup-like bearing 17 on the upper end of said shaft above the head 8. This trunnion 16 is fixed to a spider 18 secured to the body member 12 by a plurality of upright circumferentially spaced arms 19 within which the wind wheel 5 rotates. Grease may be introduced into a bearing 17 to lubricate the trunnion 16 through a relatively long upright pipe 20 within the wind wheel 5. The lower end of the pipe 20 is bent laterally outward and attached to the supporting member 7 below the blades 6, and has a valve-equipped grease gun coupling 21.

Obviously, by applying a grease gun to the coupling 21, grease may be forced into the bearing 17 while the wind wheel 5 is held against rotation without having to go to the top of the ventilator.

Overlying the wind wheel 5 and spider 18 is a conical cap 22 supported on the arms 19 and having a capping flange 23 which extends outward of the arms 19 and also the head 8. By reference to Fig. 2, it will be noted that the head 8 not only closes the upper end of the wind wheel 5, but it also closes the open under side of the cap 22 and forms a dead air space in said cap.

This dead air space prevents the hot air in the wind wheel 5 from coming into direct contact with the relatively cold cap 22 and thus prevents condensation. The cap 22 and its flange 23 also shed water and prevent down drafts in the ventilator. Such down drafts would also cause the wind wheel to rotate backwards and thereby produce further down drafts.

As shown in the drawings, the ventilator is mounted on a roof $x$ by having its cylindrical body 12 telescoped into an upstanding collar 24 on a box-like base 25 secured to said roof. It is, of course, understood that there will be a passage through the roof to the base 25 although the same is not shown. In place of the base 25, the body member 12 may be telescoped into the upper end of a vent or stack.

What I claim is:

In a ventilator, an upright tubular body, a cylindrical wind wheel having a vertical shaft axially aligned with the axis of the body, said wheel having a head completely closing the upper end of the wheel, a plurality of circumferentially spaced upright supporting arms on the body extending outward of the wind wheel and above the same, said arms having inwardly and upwardly extended extensions overlying the head of the wind wheel a conical cap supported on the arms and having a depending annular flange capping the arms and head of the wind wheel, said cap being substantially closed by the head of the wind wheel, a tie member connecting the arm extensions within the closed cap, an upper bearing on the tie member within the closed cap for the shaft of the wind wheel, and a lower bearing on the body for the lower end of the shaft.

In testimony whereof I affix my signature.

GEORGE G. TIERNEY.